United States Patent [19]

Eustache

[11] Patent Number: 5,002,419
[45] Date of Patent: Mar. 26, 1991

[54] KNUCKLE JOINT, IN PARTICULAR FOR A WINDSHIELD WIPER FOR AN AUTOMOTIVE VEHICLE

[75] Inventor: Jean-Pierre Eustache, Antony, France

[73] Assignee: Valeo Systemes D'Essuyage, Montigny-Le-Bretonneux, France

[21] Appl. No.: 538,091

[22] Filed: Jun. 13, 1990

[30] Foreign Application Priority Data

Jun. 15, 1989 [FR] France .................. 89 07965

[51] Int. Cl.⁵ .................................. F16B 9/00
[52] U.S. Cl. .......................... 403/71; 403/76; 403/114
[58] Field of Search ............ 403/113, 114, 115, 122, 403/71, 76, 70

[56] References Cited

U.S. PATENT DOCUMENTS

| | | | |
|---|---|---|---|
| 3,735,597 | 5/1973 | Guy | 403/113 X |
| 4,552,480 | 11/1985 | McIntyre | 403/71 X |
| 4,765,019 | 8/1988 | Ochino | |

FOREIGN PATENT DOCUMENTS

| | | |
|---|---|---|
| 2117085 | 10/1971 | Fed. Rep. of Germany . |
| 1504620 | 12/1967 | France . |
| 2184291 | 12/1973 | France . |
| 2508579 | 12/1982 | France . |
| 2534537 | 4/1984 | France . |
| 2608233 | 6/1988 | France . |
| 2102061 | 1/1983 | United Kingdom . |

Primary Examiner—Andrew V. Kundrat
Attorney, Agent, or Firm—Meserole, Pollack & Scheiner Dennison

[57] ABSTRACT

A knuckle joint for articulating a first bar to a second bar comprises a knuckle piece carried by the first bar and a rotary socket carried by the second bar, in such a way as to allow universal movement of one bar with respect to the other.

Stop means are provided between the first bar and the second bar so as to limit relative tilting as between the two bars. The invention is especially applicable to windshield wipers for automotive vehicles.

7 Claims, 1 Drawing Sheet

2

KNUCKLE JOINT, IN PARTICULAR FOR A WINDSHIELD WIPER FOR AN AUTOMOTIVE VEHICLE

FIELD OF THE INVENTION

The present invention relates to a knuckle joint, or ball and socket type, for articulating a first member to a second member, particularly in a windshield wiper for an automotive vehicle.

BACKGROUND OF THE INVENTION

The French published patent application No. FR 2 508 579A describes a knuckle joint for articulating a first bar to a second bar, the knuckle joint comprising generally a spherical knuckle piece carried by the first bar and a rotary socket carried by the second bar. The socket cooperates with the knuckle member so that the bars are able to move with respect to each other in a "universal" movement, whereby relative rotation can take place between the two bars and also relative tilting movement in planes containing the axis of the rotational movement.

In order to limit the inclination, or angle through which the tilting movement takes place, there may be provided, as disclosed in French patent specification No. 1 504 620, an end stop element for the tilting movement whereby the edge of the open surface of the rotary socket cooperates with a cylindrical sleeve which is provided between the knuckle piece and the bar which carries the latter.

An arrangement having the above features has the disadvantages, firstly that an additional member, namely the sleeve between the knuckle piece and the bar which carries it, has to be provided; and secondly the opening which is formed in the open side of the rotary socket is restricted by virtue of the stop element. This necessitates, in order that the knuckle piece can be mounted by a snap fit within the socket, either the exertion of a high force which introduces the risk of damage to the knuckle joint itself, or the provision of additional apertures to relieve the open side of the socket so as to allow the resilience of the edge of the opening to be increased; and this can only complicate the structure of the rotary socket.

DISCUSSION OF THE INVENTION

An object of the present invention is to overcome the disadvantages mentioned above, by providing a knuckle joint in which no special arrangements are necessary in association with the knuckle piece, while using a rotary socket of very simple form.

In accordance with the invention, a knuckle joint, for example for a windshield wiper (though not limited to such application), comprising a knuckle piece carried by a first member and a rotary socket carried by a second member, together with stop means for limiting the inclination of the said members with respect to each other, is characterised in that the said stop means comprise a projection which is carried by one of the two said members and which is adapted to cooperate with the other one of the two said members.

This arrangement enables the stop means, disposed between the two said members which are articulated together by the knuckle joint, is able to act directly on both of these two members. In addition, the height of the stop projection, and more particularly the distance between its end and the member facing it, and the distance by which it is spaced away from the knuckle piece, enable the limitation of inclination of one of the two said members with respect to the other to be easily modified.

The other features and advantages of the invention will appear more clearly from the description which follows, which is given by way of example and with reference to the accompanying drawings.

DESCRIPTION OF A PREFERRED EMBODIMENT OF THE INVENTION

Figure 1:
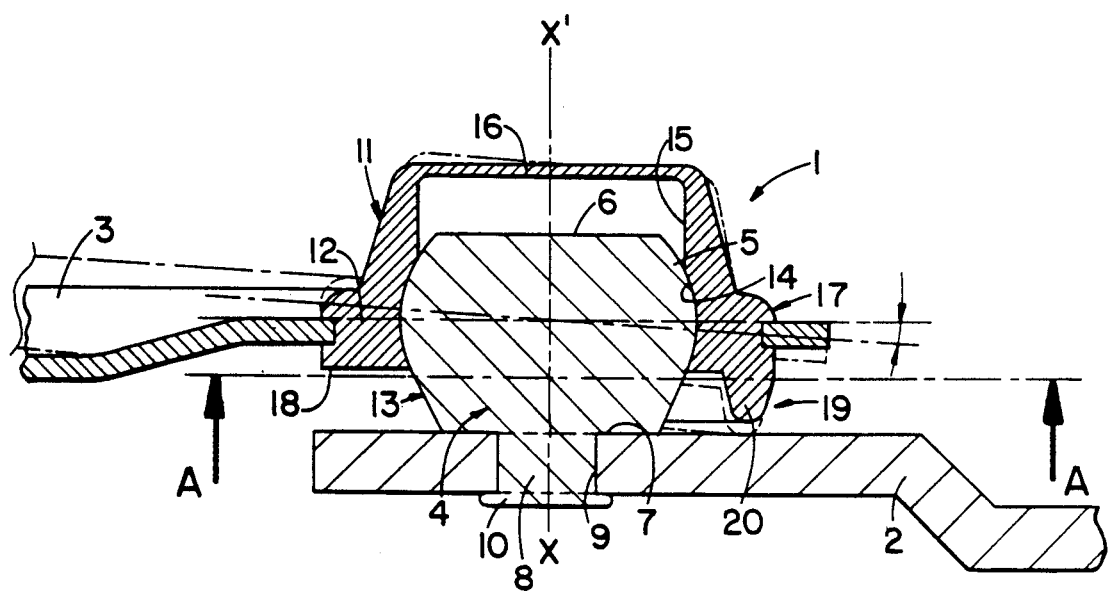
FIG. 1 is a view in cross section of a knuckle joint in accordance with the invention.

Referring to FIG. 1, a knuckle joint 1 is arranged between a first member 2, which will be referred to as the first bar, and a second member 3 (the second bar).

The first bar 2 carries one of the components of the knuckle joint, namely in this example a knuckle piece 4, which as shown in FIG. 1 is arranged orthogonally to the bar 2, to which it is secured rigidly. The knuckle piece 4 has a general axis XX', and comprises in a known manner a first portion 5 of generally spherical shape. The spherical portion 5 is truncated at both its poles, to define two parallel flat surfaces 6 and 7, which are orthogonal to the general axis XX'. The spherical portion 5 is extended axially beyond the surface 7 by a second portion 8, which is cylindrical and has a smaller diameter than the portion 5. The cylindrical portion 8 constitutes a shank for the fastening of the knuckle piece 4 to the first bar 2, by cooperation of the shank 8 with a hole 9 which is provided in the bar 2. The hole 9 has the same diameter and the same shape as the shank 8.

In the example shown, after the knuckle piece 4 has been positioned by engagement of its surface 7 on the bar 2, the shank 8 extends through the hole 9 so that its free end lies beyond the bar 2. This free end is upset to form a rivet head 10 so as to secure the bar 2 immoveably between the surface 7 and the rivet head 10.

The second bar 3 carries a rotary socket 11 which, in the case of FIG. 1, is carried in a hole 12 formed in the bar 3. However, without departing from the scope of the present invention, the rotary socket 11 may be formed directly in the body of the bar 3 in any appropriate way, for example by pressing.

The rotary socket 11 is, in a known way, tubular in shape and open at one side 13. In its interior, the socket has a curved portion 14 extending inwards from the open side 13 and corresponding to the curved surface of the spherical portion 5 of the knuckle piece 4. The curved surface portion 14 is extended by a cylindrical surface portion 15, of reduced diameter, which extends up to the base wall 16 of the socket 11. Close to the open side 13, the socket 11 has a radial, annular bead 17 which projects radially outwardly from the end of the socket. The latter is secured in the hole 12 of the bar 3 by means of this bead 17. The bead 17 has a flat surface 18 which is situated close to the open side 13, and which is substantially parallel to the base wall 16 while being spaced away from the second bar 3.

To facilitate understanding of the rest of this description, it will be assumed that the first bar 2 and the knuckle piece 4 are fixed, while the second bar 3, carrying the rotary socket 11, is moveable about the knuckle piece 4 with respect to the bar 2. This movement consists essentially in circumferential rotary movement about the axis XX' and in tilting of the general axis of the bar 3 with respect to the fixed axis XX', with sliding of the curved surface portion 14 on the spherical portion 5 of the knuckle joint 4 in both cases. Thus, in the configuration of FIG. 1, the two bars 2 and 3 are seen as being parallel to each other in the rest position of the assembly. The rotary socket 11 has both its open side 13 and its flat surface 18, associated therewith, directed towards the first bar 2.

A stop means 19 is provided between the first bar 2 and the second bar 3, so as to limit the tilting of the bar 3 with respect to the fixed bar 2. This stop means comprises a projection 20 which extends substantially parallel to the axis XX' and which is spaced away from the knuckle piece 4. As is best seen in FIG. 1, the projection 20, which may be carried by either one of the two bars 2 and 3, is in this example carried by the bar 3. It is arranged close to the free end of the bar 3 and is directed towards the other bar 2. The projection 20 comprises a protuberance which is substantially orthogonal to the surface 18 of the rotary socket 11. In cross section it has the general shape of an isosceles triangle rounded at its apex, the base of this triangle being coincident with the surface 18. The rounded free end of the projection 20 lies in the vicinity of, but spaced away from, the first bar 2, and is preferably moulded integrally with the rotary socket 11.

Figure 2:
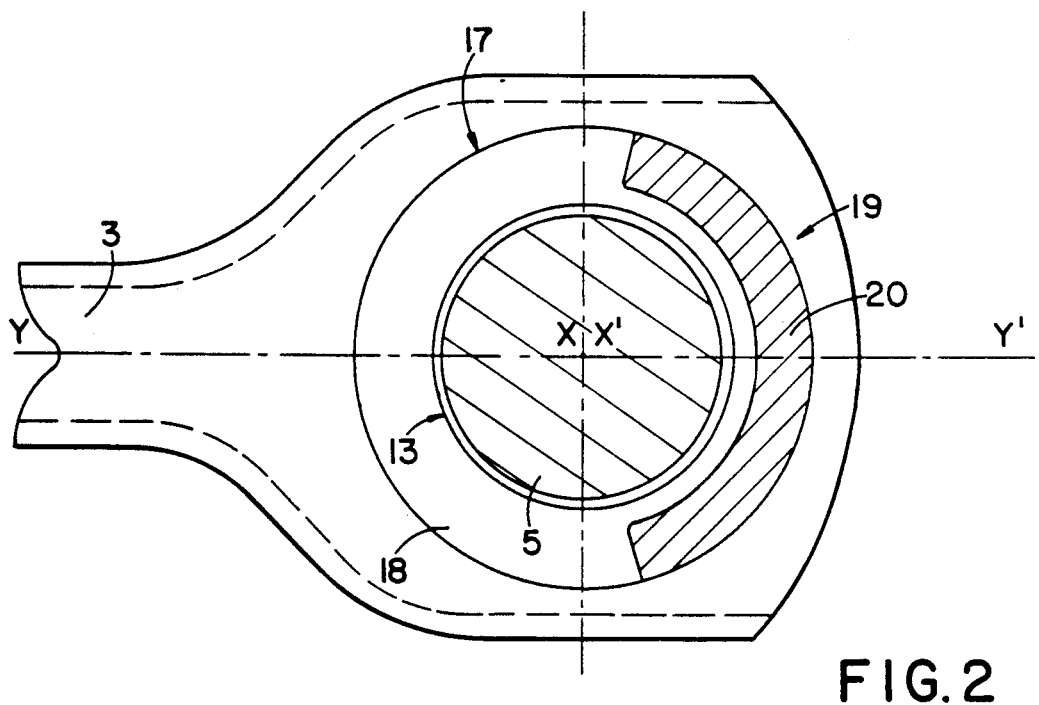
FIG. 2 is a view in cross section taken on the line A—A in FIG. 1.

The maximum inclination of the bar 3 with respect to the bar 2 is thus dependent on the distance separating the free end of the projection 20 from the other bar 2 which faces towards it. In addition, as seen in FIG. 2, the projection 20 extends circumferentially (in this example partially circumferentially), about the axis XX' and spaced radially from the latter.

In operation, when the bar 3 is subjected to severe tilting, the free end of the projection 20 comes into contact with the first bar 2, as is indicated in phantom lines in FIG. 1, thus limiting the tilting of the bar 3. In this position, the partially circumferential extent of the projection 20 is preferably such as to limit the rotation of the second bar 3 about its general longitudinal axis YY'.

The present invention is not limited to the embodiment described, but embraces any variant. For example, each of the bars 2 and 3 may be provided with a respective projection, these two projections being arranged at different distances from the knuckle piece 4. Similarly, the projection 20 may extend discontinuously, around either part or all of the circumference.

What is claimed is:

1. An articulated ball and socket joint interconnecting a first member to a second member comprising a knuckle piece including a first portion of generally spherical shape and truncated polar portions defining generally flat parallel surfaces, one of said polar surfaces further defining a cylindrical shank configured to extend through and fastened to a complementary opening in said first member, socket means secured to said second member and configured to embrace the spherical portion of said knuckle to retain said second member in articulated assembled relation to said first member, said socket including a first portion of complementary shape with respect to said spherical portion of said knuckle and a second portion of cylindrical shape thereabove, said socket being further configured to include a generally planar surface adjacent to and spaced from said first member, and stop means for limiting rotational movement of said socket and said second member with respect to said knuckle in one plane while permitting unrestricted rotational movement of said second member and said socket in a second plane.

2. The invention defined in claim 1 wherein said stop means includes a projection positioned on said planar surface adjacent said first member and engageable therewith to limit rotational movement of said second member around said knuckle in one plane while permitting unrestricted rotation of said components in said second plane.

3. A knuckle joint according to claim 1, wherein the stop means are spaced away from the knuckle piece.

4. A knuckle joint according to claim 1, wherein the said projection is located adjacent a free end of the said member by which it is carried.

5. A knuckle joint according to claim 1, wherein the said projection extends partly circumferentially.

6. A knuckle joint according to claim 1, wherein the said projection is carried by the rotary socket.

7. A knuckle joint according to claim 6, wherein the said projection is formed integrally with the rotary socket.

* * * * *